(12) United States Patent
Wu

(10) Patent No.: US 7,162,231 B2
(45) Date of Patent: Jan. 9, 2007

(54) INTERACTIVE METHOD FOR ELECTRONIC EQUIPMENT

(75) Inventor: Chien-Li Wu, Taipei (TW)

(73) Assignee: Inventec Corporation (TW)

( * ) Notice: Subject to any disclaimer, the term of this patent is extended or adjusted under 35 U.S.C. 154(b) by 119 days.

(21) Appl. No.: 10/988,088

(22) Filed: Nov. 12, 2004

(65) Prior Publication Data

US 2005/0282561 A1 Dec. 22, 2005

(30) Foreign Application Priority Data

Jun. 21, 2004 (TW) ............................... 93117885 A

(51) Int. Cl.
*H04M 3/00* (2006.01)
(52) U.S. Cl. ................ 455/418; 455/456.6; 455/456.2; 345/102; 345/207; 725/12
(58) Field of Classification Search ................ 455/418, 455/456.6, 556.2, 456.2; 345/102, 207; 725/12
See application file for complete search history.

(56) References Cited

U.S. PATENT DOCUMENTS

| 6,618,045 | B1 * | 9/2003 | Lin ............................ 345/207 |
| 2004/0230904 | A1 * | 11/2004 | Tada .......................... 715/517 |
| 2004/0233153 | A1 * | 11/2004 | Robinson ..................... 345/102 |
| 2005/0229200 | A1 * | 10/2005 | Kirkland et al. .............. 725/12 |

* cited by examiner

*Primary Examiner*—Danh Cong Le
(74) *Attorney, Agent, or Firm*—Peter F. Corless; Steven M. Jensen; Edwards Angell Palmer & Dodge LLP

(57) ABSTRACT

An interactive method for electronic equipment is proposed. At least one interactive device is installed in the electronic equipment. Light intensity of an environment surrounding the electronic equipment and a user's operating condition are constantly detected by the interactive device. Back light intensity of a liquid crystal display and a keyboard base of the electronic equipment are adjusted according to the detected result. Moreover, the user's operating condition is determined as either being away from an operating position or being located in the operating position. If the user's location is altered from being away from the operating position to being in the operating position, the electronic equipment operates a greeting mechanism preset by the user. If the user's location is altered from being in the operating position to being away from the operating position, the electronic equipment is actuated to enter a stand-by mode after a predetermined period of time.

13 Claims, 3 Drawing Sheets

INTERACTIVE METHOD FOR ELECTRONIC EQUIPMENT

FIELD OF THE INVENTION

The present invention relates to techniques for improving functionality of electronic equipment, and more particularly, to an interactive method that can automatically operate a greeting function according to a predetermined greeting mechanism when sensing a user returning to an operating position.

BACKGROUND OF THE INVENTION

A current development trend for electronic equipment tends towards light-weighted, thin, and miniaturized electronic equipment, especially for portable electronic equipment (such as notebook computers). Recently, not only has each equipment manufacturer been striving for a reduced size of the electronic products, but additional functions of the product are also becoming more demanded due to rising consumer consciousness. Thus, a humanized product has been proposed, and a large amount of human and material resources have been invested into development of humanized products. For example, the body case of the notebook computer is designed to have an arc that can be more easily handled by a user, so as to provide the user convenience in carrying. Further, materials of an operating interface (such as buttons of a keyboard) can also be improved, such that the user is able to comfortably operate various functions of the electronic equipment via the improved material of the interface.

However, the foregoing so-called humanized functions have been directed to the appearance of the product. In other words, current manufacturers merely provide the consumer humanized functions in hardware but not in software. In light of this, manufacturers of cellular phones are more active in providing the consumer humanized functions; such as person identification via voice recognition, a personalized flip-type screen, and representation of different speakers using different images or ring tones. Such humanized functions that have been excellently provided by the manufacturer of the cellular phones are still lacking in other electronic equipment. If the electronic equipment is capable of giving a warm face-to-face greeting before the user starts to contact with the operating interface, the electronic equipment will attract consumer's attention. In addition, most service providing public places, such as airports, stations, show rooms and libraries, have a plurality of electronic equipment providing relevant information for user to look up on. Interaction between the user and the electronic equipment can be reinforced if a warm greeting can be provided before the user gets into actual contact with the electronic equipment, and the user would be impressed by the service of the place.

Therefore, learning from the advantages and successes of cellular phones with humanized interaction functions, electronic equipment with humanized interaction functions are also needed in order to raise competitiveness of the products.

SUMMARY OF THE INVENTION

In light of the drawbacks in the prior art, a primary objective of the present invention is to provide an interactive method for electronic devices, which is capable of automatically operating a greeting function according to a predetermined greeting mechanism when sensing a user returning to an operating position.

In accordance with the above objective, one embodiment of the present invention proposes an interactive method for electronic equipment at least comprising the steps of:
(1) providing at least an interactive device being installed in the electronic equipment;
(2) constantly detecting the surrounding environment of the electronic equipment using the interactive device;
(3) determining the user's operating conditions as either being away from an operating position or being located in the operating position according to the foregoing detected result; and
(4) operating a predetermined greeting mechanism when the user's operating condition is altered from being away from the operating position to being located in the operating position.

In accordance with the above objective, another embodiment of the present invention proposes an interactive method for electronic equipment at least comprising the steps of:
(1) providing at least an interactive device being installed in the electronic equipment;
(2) constantly detecting condition of surrounding environment of the electronic equipment using the interactive device;
(3) determining the user's operating conditions as either being away from an operating position or being located in the operating position according to the detected result; and
(4) adjusting back light of a display screen of the electronic equipment according to light intensity in a surrounding environment when the user's operating condition is altered to being located in an operating position.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

To provide a further understanding of the invention, the following detailed description illustrates embodiments and examples of the invention, it is to be understood that this detailed description is being provided only for illustration of the invention and not as limitation of the scope of this invention.

Figure 3:
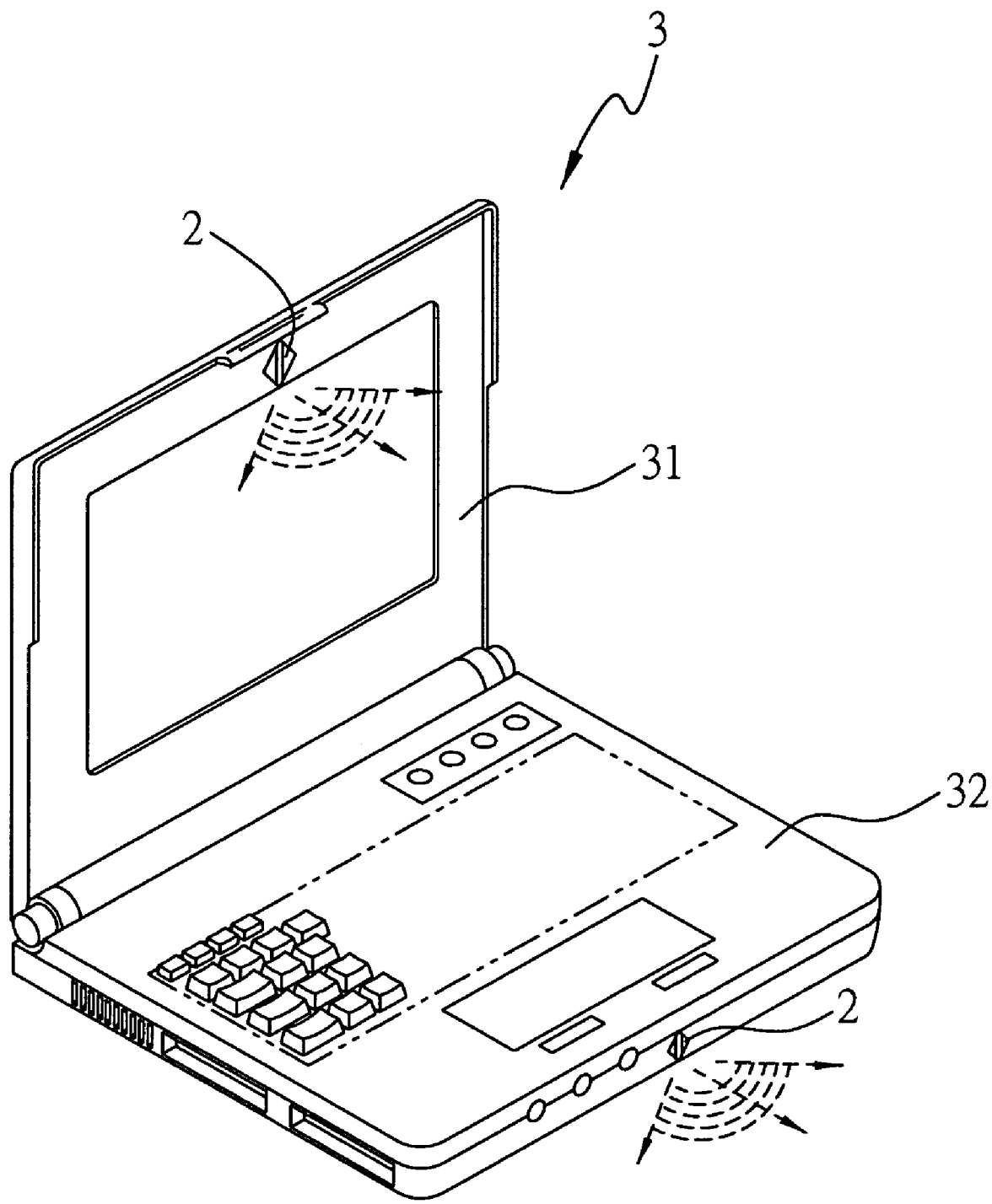
FIG. 3 is an oblique stereogram showing an interactive device being actually installed in a notebook computer.

Referring to FIG. 3, an interactive method proposed in the present invention is applied to a notebook computer 3 in the present embodiment. However, one should note that, the application of the interactive method proposed in the present invention is not limited only to the notebook computer. Generally speaking, the interactive method proposed in the present invention is applicable to any electronic equipment, so that the electronic equipment is provided with a function, which enables interaction with a user.

Figure 1:
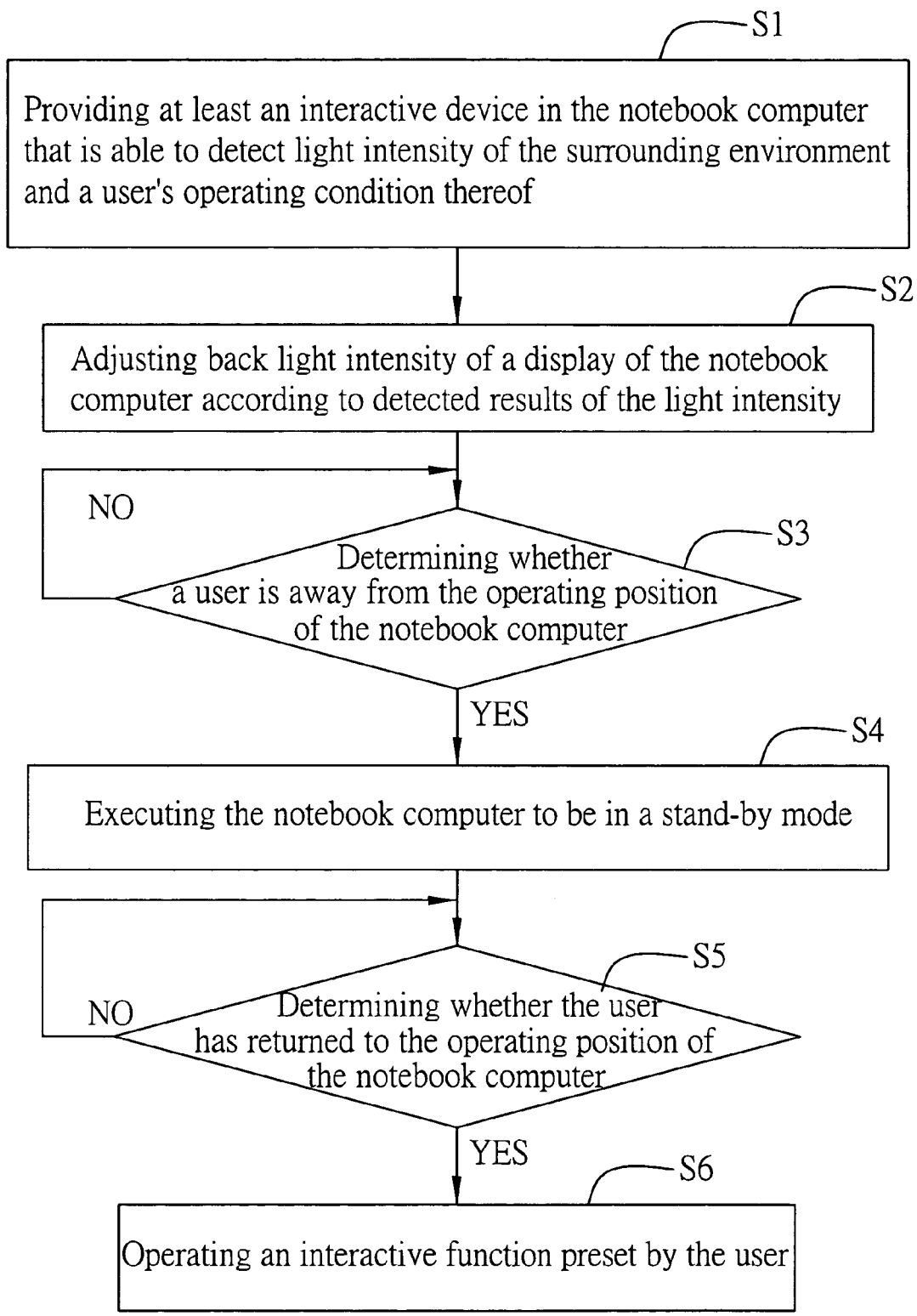
FIG. 1 is a flowchart showing operating steps implemented by an interactive function of a notebook using an interactive method according to the present invention.
Figure 2:
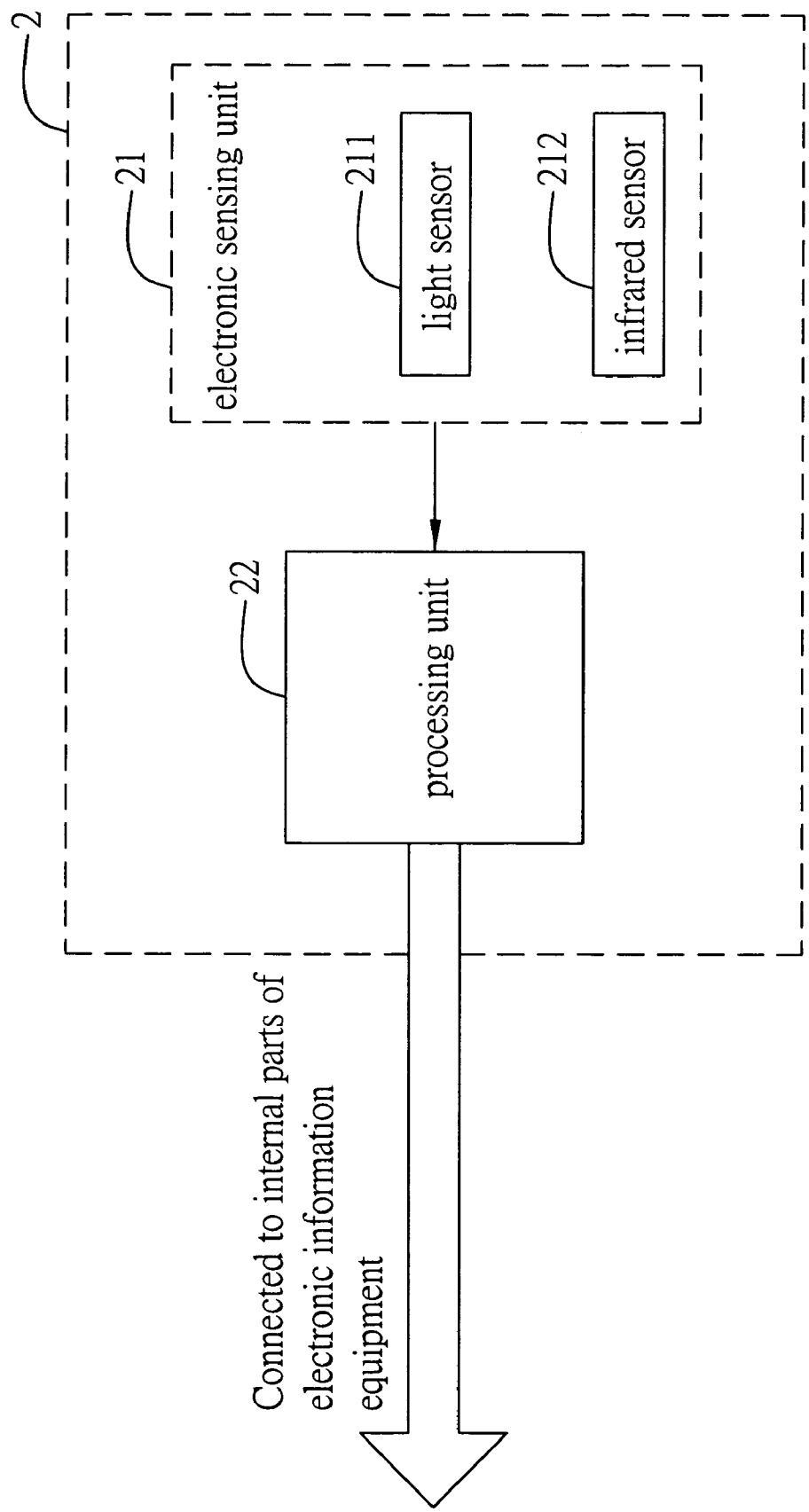
FIG. 2 is a block diagram showing a connecting relationship of internal components of an interactive device using the method according to the present invention.

FIG. 1 is a flowchart showing operating steps implemented by an interactive function of a notebook using an interactive method according to the present invention. FIG. 2 is a block diagram showing a connecting relationship of internal components of an interactive device 2 using the method according to the present invention. The interactive device 2 comprises an electronic sensing unit 21 and a processing unit 22, wherein the electronic sensing unit 21 further comprises a light sensor 211 and/or an infrared sensor 212 (according to practical requirements, the number of the sensor can be altered, and the kinds of the sensor can also be altered to a temperature sensor, humidity sensor, image sensor, pressure sensor, etc.). Procedures of the interactive method proposed in the present invention applied in the notebook computer 3 to provide an interaction between the computer and the user are described in the following with FIGS. 1, 2 and 3. The notebook computer 3 is being installed with an auxiliary illuminating device (not shown) for providing a light source for a keyboard base 32 in a dim environment.

Referring to FIG. 3, first of all, at least an interactive device 2 is installed in the notebook computer 3. In the present embodiment, an interactive device 2 is respectively installed on a display screen such as liquid crystal display 31 and the keyboard base 32 of the notebook computer 3, so that the interactive device 2 is able to detect an operating condition of the notebook computer 3 by the user and light intensity of the surrounding environment. Subsequently, the user can set up a greeting mechanism (such as greeting functions using voices, music or images, depending on practical requirements) that can be operated by the notebook computer 3. In the following embodiments, the user sets up a voice greeting function, for example, "Welcome", prior to Step S2.

Referring to Step S2, the light sensor 211 comprised in the interactive device 2 is able to constantly detect the light intensity of the environment surrounding the notebook computer 3 according to a period predetermined by the user. Detected results are immediately transferred to the processing unit 22 for analysis, such that a central processor (not shown) installed in the notebook computer 3 can actuate and adjust back light power sources of the liquid crystal display 31 based on the detected results analyzed by the processing unit 22. Also, the auxiliary illuminating device (not shown) is actuated for serving as light sources for the keyboard base 32 when the light is too dim and the intensity of the back light of the liquid crystal display 31 can be correspondingly adjusted. Thus, the user can operate the notebook computer 3 under a condition with sufficient light. Then, Step S3 is performed.

Referring to Step S3, the interactive device 2 determines whether the user has already left the operating position of the notebook computer 3, in which detection by the light sensor 211 is based on whether light signals sent out by the light sensor 211 is obstructed. If the light signal is not obstructed, which means that the user has already left the operating position, Step S4 will be immediately performed to execute a process; otherwise Step S2 will be re-performed.

Referring to Step S4, when the interactive device 2 detects that the user has already left the operating position, an actuating signal is send out to the central processor (not shown) installed in the notebook computer 3 by the processing unit 22, the notebook computer 3 is actuated by the signal to enter into a stand-by mode by the central processor to reduce energy dissipation of the notebook computer 3 prior to perform Step S5.

Referring to Step S5, during the period of time that the user is away from the operating position, the light sensor 211 and the infrared sensor 212 installed in the interactive device 2 also constantly send out detecting signals (including light signals and infrared signals) according to the period predetermined by the user, so that the interactive device 2 is able to use such signals as references to determine whether the user has returned to the operating position. The interactive device 2 is capable of detecting whether the light signal sent out by the light sensor 211 has been obstructed. If the signal has been obstructed, the processing unit 22 further determines whether temperature detected by the infrared sensor 212 matches the temperature of the user. If the temperature matches, the processing unit 22 can confirm that the user has already returned to the operating position and immediately send out a signal to the central processor to once again actuate operation of the notebook computer 3. Thus, a condition that animals or other objects are misunderstood to be the user by the interactive device 2 can be avoided. Subsequently, Step S6 is performed otherwise the procedure is returned to Step S5.

It should be noted that, alternatively, the interactive device 2 might determine whether the user is in the operating position based on only the result detected by one of the light sensor 211 and infrared sensor 212.

Referring to the Step S6, after the interactive device 2 has confirmed that the user has returned to the operating position, a signal is immediately sent out to the central processor (not shown) installed in the notebook computer 3 by the processing unit 22, so as to wake up the notebook computer 3 to start operating again. Furthermore, a voice chip (not shown) comprised in the notebook computer 3 is actuated to send out a voice signal of "Welcome" to the user according to the voice greeting function preset by the user.

Alternatively, in another embodiment of the present invention, after the interactive device 2 detected the user has returned to the operating position, then the light sensor 211 of the interactive device 2 detects again the light intensity of the surrounding environment of the notebook computer 3 at periods preset by the user, in order for the central processing unit (not shown) of the notebook computer 3 to adjust the back light of the liquid crystal display 31 accordingly. Thereupon, the auxiliary illuminating device (not shown) functioning as the light source for keyboard base 32 can be actuated and the back light intensity of the liquid crystal display 31 can be adjusted accordingly under dim light, so that the user can operate the notebook computer 3 under a satisfactory lighting condition.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An interactive method for electronic equipment, for automatically providing a preset mode of a greeting mechanism to a user of the electronic equipment, the interactive method comprising the steps of:
   (1) providing at least one interactive device being installed in the electronic equipment;
   (2) constantly detecting a condition of a surrounding environment of the electronic equipment via the interactive device;

(3) determining whether the user's location is changed from being away from an operating position to being in the operating position according to the detected condition in step (2); if yes, proceeding to step (4); if no, repeating step (3); and (4) operating the preset mode of the greeting mechanism when the user's location is changed from being away from the operating position to being in the operating position.

2. The interactive method for electronic equipment of claim 1, wherein the electronic equipment is one selected from the group consisting of a desktop computer, notebook computer, and laptop computer.

3. The interactive method for electronic equipment of claim 1, wherein the preset mode of the greeting mechanism indicates a greeting function that is automatically operated by the electronic equipment according to a preset condition set by the user.

4. The interactive method for electronic equipment of claim 3, wherein the greeting function is one selected from the group consisting of a voice greeting function, music greeting function, and image greeting function.

5. The interactive method for electronic equipment of claim 1, wherein a display screen and a keyboard base of the electronic equipment are each installed with the interactive device.

6. The interactive method for electronic equipment of claim 1, wherein the interactive device comprises a light sensor and/or an infrared sensor.

7. The interactive method for electronic equipment of claim 1, wherein the condition of the surrounding environment detected by to interactive device comprises a light intensity condition surrounding to electronic equipment.

8. The interactive method for electronic equipment of claim 7, wherein the electronic equipment is capable of adjusting back light intensity of a display screen thereof and light source intensity of a keyboard base thereof according to the light intensity condition of the surrounding environment detected by the interactive device when the user is located in the operating position.

9. The interactive method for electronic equipment of claim 1, wherein the condition of the user being located away from the operating position indicates that the user is located outside an area that is detectable by the interactive device, and the condition of the user being located in the operating position indicates that the user is Located within the area that is detectable by the interactive device.

10. The interactive method for electronic equipment of claim 1, wherein the change of the user's location from being away from the operating position to being in the operating position is determined by the interactive device according to whether light emitted from the interactive device is obstructed by the user.

11. The interactive method for electronic equipment of claim 1, wherein the change of the user's location from being away from the operating position to being in the operating position is determined by the interactive device according to whether a temperature of an object detected by the interactive device matches a temperature of the user.

12. The interactive method for electronic equipment of claim 10, wherein the change of the user's location from being away from the operating position to being in the operating position is determined by the interactive device according to whether a temperature of an object detected by the interactive device matches a temperature of the user.

13. The interactive method for electronic equipment of claim 1, between step (2) and step (3), further comprising a step of determining whether the user's location is changed from being in the operating position to being away from the operating position after a preset period of time; if yes, actuating the electronic equipment to enter a stand-by mode and proceeding to step (3); if no, repeating this determination step.

* * * * *